United States Patent
Zhao et al.

(10) Patent No.: US 9,972,206 B2
(45) Date of Patent: May 15, 2018

(54) WET ROAD SURFACE CONDITION DETECTION

(71) Applicant: GM GLOBAL TECHNOLOGY OPERATIONS LLC, Detroit, MI (US)

(72) Inventors: Qingrong Zhao, Madison Heights, MI (US); Jinsong Wang, Troy, MI (US); Qi Zhang, Sterling Heights, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 14/957,943

(22) Filed: Dec. 3, 2015

(65) Prior Publication Data
US 2017/0162045 A1 Jun. 8, 2017

(51) Int. Cl.
| | |
|---|---|
| *G08G 1/0967* | (2006.01) |
| *B60K 31/16* | (2006.01) |
| *B60T 8/171* | (2006.01) |
| *B60T 8/175* | (2006.01) |
| *G08G 1/0965* | (2006.01) |
| *G01S 13/95* | (2006.01) |
| *G06K 9/00* | (2006.01) |
| *G08G 1/04* | (2006.01) |
| *G08G 1/0962* | (2006.01) |
| *B60T 8/172* | (2006.01) |
| *B60R 16/023* | (2006.01) |

(52) U.S. Cl.
CPC ....... *G08G 1/096791* (2013.01); *B60K 31/16* (2013.01); *B60R 16/0237* (2013.01); *B60T 8/171* (2013.01); *B60T 8/172* (2013.01); *B60T 8/175* (2013.01); *G01S 13/95* (2013.01); *G06K 9/00791* (2013.01); *G08G 1/04* (2013.01); *G08G 1/0965* (2013.01); *G08G 1/09626* (2013.01); *B60R 2300/8053* (2013.01); *B60T 2210/12* (2013.01); *B60T 2210/13* (2013.01)

(58) Field of Classification Search
None
See application file for complete search history.

(56) References Cited

U.S. PATENT DOCUMENTS

| | | | |
|---|---|---|---|
| 2014/0081507 A1* | 3/2014 | Urmson | B60W 40/06 701/28 |
| 2016/0379065 A1* | 12/2016 | Hartmann | G06K 9/00798 348/148 |

* cited by examiner

*Primary Examiner* — Shelley Chen
(74) *Attorney, Agent, or Firm* — Quinn IP Law

(57) ABSTRACT

A method for determining a wet surface condition of a road. Capturing an image of a wheel of a remote vehicle traveling in an adjacent lane by an image capture device of a host vehicle. Identifying in the captured image, by processor of a host vehicle, a region of interest relative to the wheel where the region of interest is representative of where precipitation dispersion occurs. A determination is made whether precipitation is present in the region of interest. A wet road surface signal is generated in response to the identification of precipitation in the adjacent lane.

24 Claims, 6 Drawing Sheets

WET ROAD SURFACE CONDITION DETECTION

BACKGROUND OF INVENTION

An embodiment relates generally to detection of a wet road surface using detection of water dispersion.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

SUMMARY OF INVENTION

An advantage of an embodiment is the detection of water on a road using a vision-based imaging device and radar based or similar device that identifies precipitation dispersed from the surface of the road by other vehicles. The technique described herein requires no excitations from the vehicle or driver for initiating a determination of whether precipitation is present. Rather, precipitation is determined in response to monitoring splash by the wheels of a vehicle in an adjacent lane utilizing both imaging devices and radar-type devices. An adjacent wheel zone is localized and the contours of the wheel and rim are extracted. A region of interest is identified relative to the location of wheel for analyzing whether precipitation is present on the surface of the road of an adjacent vehicle.

An embodiment contemplates a method of determining a wet surface condition of a road. Capturing an image of a wheel of a remote vehicle traveling in an adjacent lane by an image capture device of a host vehicle. Identifying in the captured image, by processor of a host vehicle, a region of interest relative to the wheel where the region of interest is representative of where precipitation dispersion occurs. A determination is made whether precipitation is present in the region of interest. A wet road surface signal is generated in response to the identification of precipitation in the adjacent lane.

DETAILED DESCRIPTION

Figure 1:
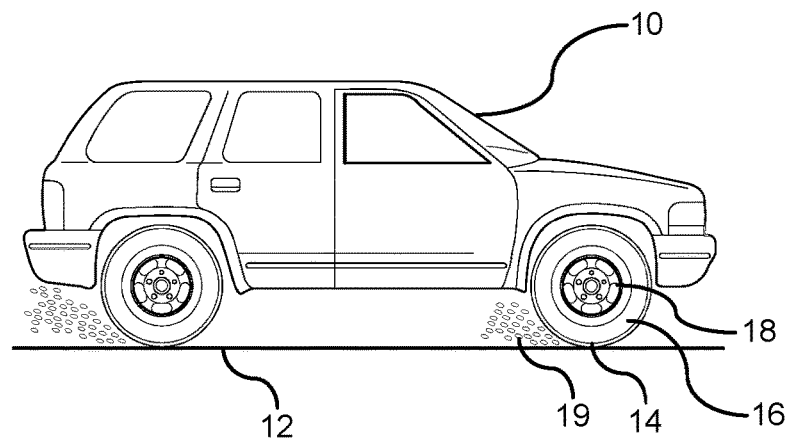
FIG. 1 is an exemplary perspective view of a vehicle scene on a wet surface captured by a camera.

There is shown in FIG. 1, a vehicle 10 traveling along a vehicle road 12. Precipitation 14 shown disposed on the vehicle road 12 is often displaced by the vehicle wheel 14 and tires 16 mounted on a rim 18 of the wheel 14 as the tires rotate over the wet surface on the vehicle road 12. It is often advantageous to know when the vehicle will be traveling along a wet vehicle road 12 so that issues resulting from precipitation, such as loss of traction or engine degradation resulting from water entering exterior air intake vents can be negated or at least mitigated.

Precipitation 19 on the vehicle road 12 can result in a reduction of traction when driving on the wet road surface. The precipitation 14 disposed on the vehicle road 12 lowers the coefficient of friction between the vehicle tires and the vehicle road 12. As a result, traction between the vehicle tires and the vehicle road 12 is lowered. Loss of traction can be mitigated by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle. It should be understood that the embodiments described herein can be applied to other types of systems aside from automobiles where detection of a wet road surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Figure 3:
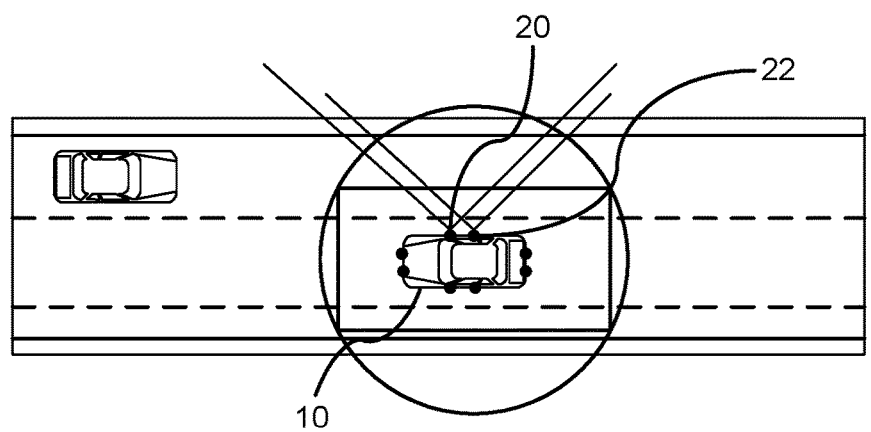
FIG. 3 is an exemplary perspective view of a vehicle surround having surround view coverage.
Figure 2:
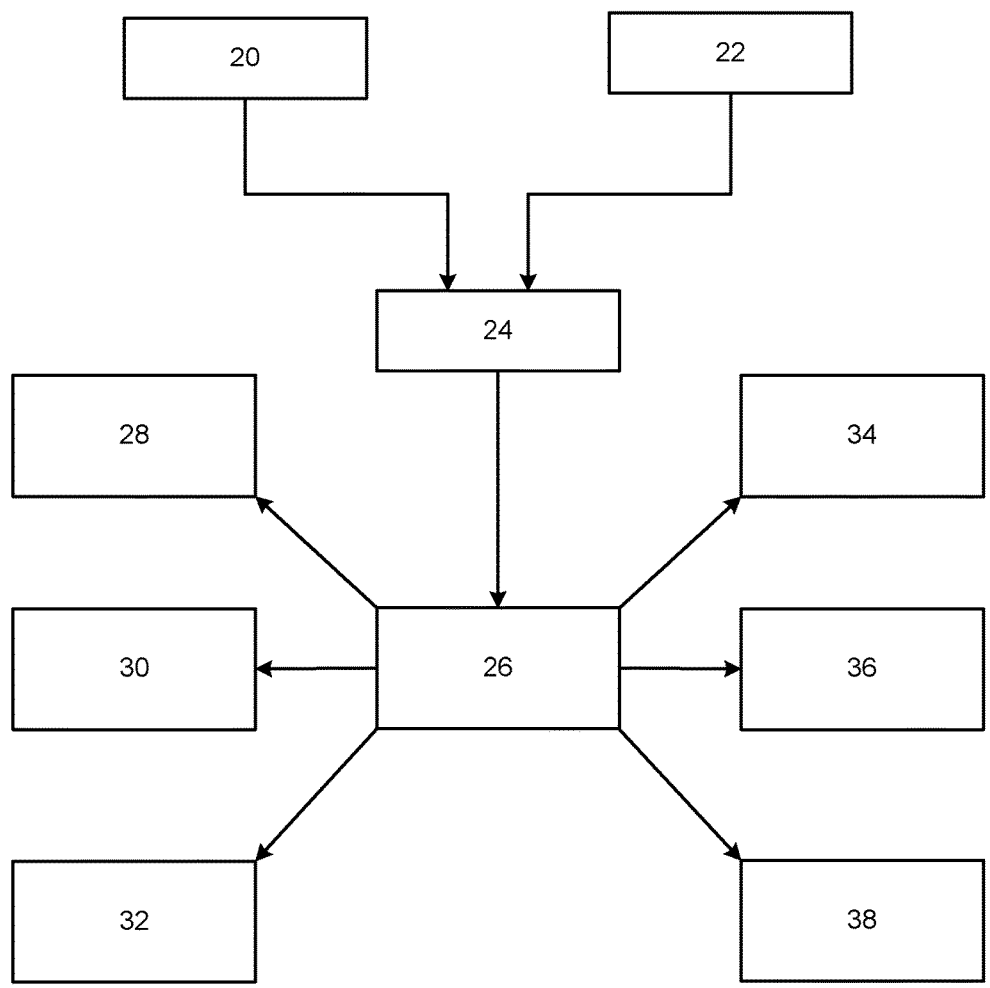
FIG. 2 illustrates a block diagram of a wet road surface detection system.

FIG. 2 illustrates a block diagram of a wet road surface detection system. A plurality of vehicle-based image capture devices 20 are mounted on the vehicle for capturing images around the vehicle. The plurality of vehicle based image capture devices 20 may be mounted on the front, rear, and sides of the vehicle. In addition, a plurality of sensing-based devices 22 are also mounted about the vehicle for detecting objects about the vehicle. It should be understood that the sensing-based devices may include, but are not limited to, radar-based devices, Lidar-based devices, and ultrasonic devices (for exemplary purposes herein, sensing data will be referred to radar-based data, but it should be understood that the embodiments described herein are not limited to radar data). The sensing-based devices 22 may also be disposed on the front, rear, and sides of the vehicle. FIG. 3 illustrates an exemplary 360 degree sensor coverage for sensing objects around the vehicle. Each of the devices are cooperatively used to detect and identify objects on each side of the vehicle. Such devices such as the vehicle-based image capture devices 20 and the sensing-based devices 22 may be currently utilized on the vehicle various object detection systems that use the results for various vehicle operations. Each of the devices in the embodiments described herein will be used to detect a wheel in the field of view can determine whether precipitation is present on the road.

Referring again to FIG. 2, a processor 24 processes the images captured by the image capture devices 20 and data obtained by the sensing-based devices 22. The processor 24 analyzes images and data to determine whether a wheel from another vehicle in an adjacent lane is detected. Once the processor 24 identifies the wheel from another vehicle in the adjacent lane, the processor 24 localizes and analyzes the wheel in a region surrounding the wheel to determine whether precipitation is present on the road. The processor 24 may be part of an existing system, such as traction control system or other system, or can be a standalone processor dedicated to analyzing data from the image capture devices 20 and sensing-based devices 22.

The processor 24 may be coupled to one or more output devices such as a controller 26 for initiating or actuating a control action if precipitation is found on the road surface. One or more countermeasures may be actuated for mitigating the effect that the precipitation may have on the operation of the vehicle.

The controller 26 may be part of the vehicle subsystem or may be used to enable a vehicle subsystem for countering the effects of the water. For example, in response to a determination that the road is wet, the controller 26 may enable an electrical or electro-hydraulic braking system 28 or similar where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels and brakes maintains an expected coefficient of friction between the vehicle brake actuators and the braking surface of the wheels when braking by the driver is manually applied.

The controller 26 may control a traction control system 30 which distributes power individually to each respective wheel for reducing wheel slip by a respective wheel when precipitation is detected on the road surface.

The controller 26 may control a cruise control system 32 which can deactivate cruise control or restrict the activation of cruise control when precipitation is detected on the road surface.

The controller 26 may control a driver information system 34 for providing warnings to the driver of the vehicle concerning precipitation that is detected on the vehicle road. Such a warning actuated by the controller 26 may alert the driver to the approaching precipitation on the road surface and may recommend that the driver lower the vehicle speed to a speed that is conducive to the current environmental conditions, or the controller 26 may actuate a warning to maintain a safe driving distance to the vehicle forward of the driven vehicle. It should be understood that the controller 26, as described herein, may include one or more controllers that control an individual function or may control a combination of functions.

The controller 26 may further control the actuation of automatically opening and closing air baffles 36 for preventing water ingestion into an engine of the vehicle. Under such conditions, the controller 26 automatically actuates the closing of the air baffles 36 when precipitation is detected to be present on the road surface in front of the vehicle and may re-open the air baffles when precipitation is determined to no longer be present on the road surface.

The controller 26 may further control the actuation of a wireless communication device 38 for autonomously communicating the wet pavement condition to other vehicles utilizing a vehicle-to-vehicle or vehicle-to-infrastructure communication system.

The controller 26 may further provide the wet road surface signal alerts to a driver of the vehicle against a use of automated features in addition to those listed herein.

The advantage of the techniques described herein is that no excitations are required from the vehicle or driver for initiating a determination of whether water or precipitation is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water or precipitation. In contrast, the techniques described herein provide an anticipatory or look-ahead analysis so as to leave time for the driver or the vehicle to take precautionary measures prior to the vehicle reaching the location of the water or precipitation.

Figure 4:
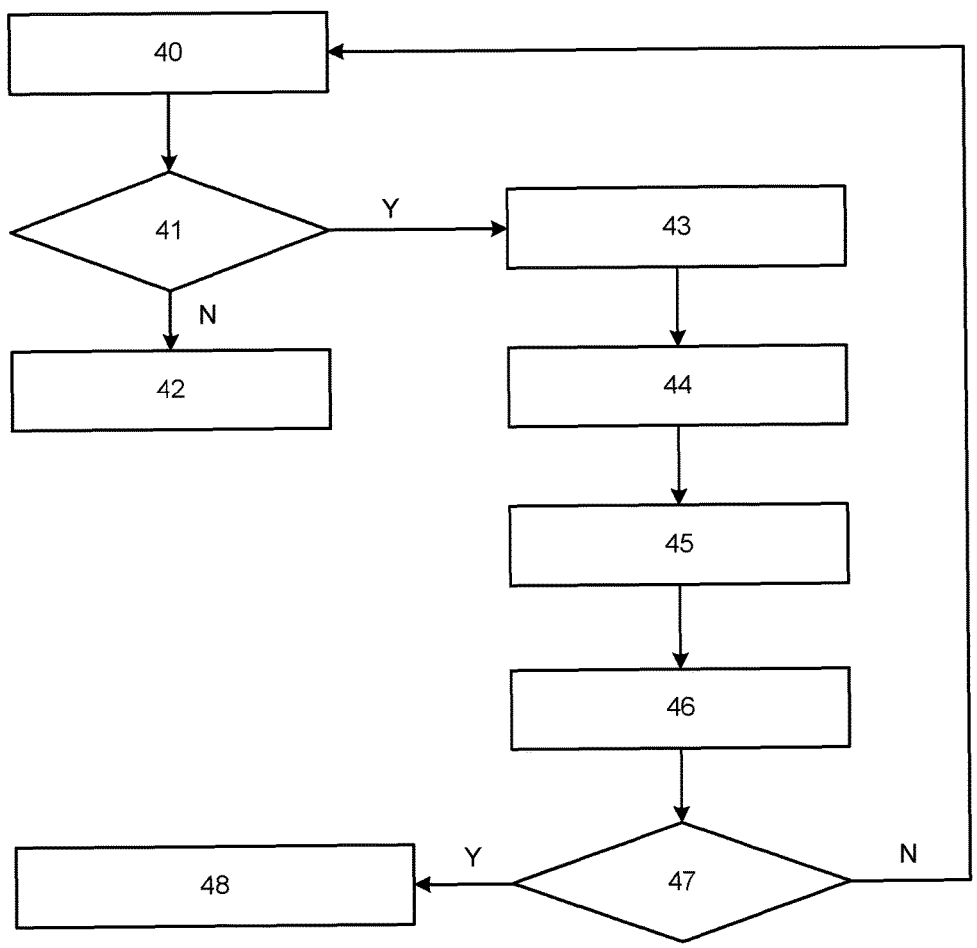
FIG. 4 illustrates a flowchart of a method for detecting a wet surface.

FIG. 4 illustrates a flowchart of a method for detecting a wet surface of the road. In step 40, a sensor/fusion module is provided that obtains object information such as, but not limited to, a type of object, position of the object, and speed of the object heading angle of the object. Various characteristics of the object may be analyzed for determining whether the object is a vehicle having wheels traveling on a road surface of an adjacent lane. The vehicle traveling in the adjacent lane may be a vehicle traveling in a same direction as a host vehicle (i.e., the vehicle monitoring other surrounding vehicles) or a vehicle in an adjacent lane traveling in an opposite direction of the host vehicle.

In step 41, a determination is made by the processor whether a wheel is detected in a field of view of an image captured by one of the image capture devices and sensing devices. If the determination is made that the wheel is not detected in the field of view of any of the capture devices, then the routine proceeds to step 42 where other approaches may be used to detect precipitation on the road surface. If the determination is made that a wheel is detected, then the routine proceeds to step 43.

In step 43, wheel zone localization is applied by the processor. Localization of the wheel is identified utilizing the image obtained by the image capture device based on a real center position reported by the radar. That is, radar data will identify a center position of the wheel and localization of the wheel within a reference frame will be determined based on the center position.

In step 44, contours of the wheel are identified from the image by a wheel contour extraction technique. The technique extracts a contour of the tire and a contour of the rim in the wheel zone as determined in step 43.

In step 45, a region of interest is identified from the localized region. This technique localizes the region of interest which includes a respective region relative to the tire where dispersed precipitation is anticipated if present. The region of interest for dispersed precipitation may be identified on a location relative to the wheel utilizing a wheel center position and wheel contour information. Identifying the region of interest may also be identified based on other criteria such as the wheel center position relative to an adjacent underbody of the vehicle.

In step 46, dispersed precipitation analysis is performed to determine whether water is present on the road surface. This is determined by analyzing whether water droplets are present in the air in the region of interest as a result of water from the road surface being kicked up as the tire rotates. This may be performed by a processor, classifier, or other machine learning such as deep learning techniques.

In step 47, a determination is made whether dispersed precipitation is present in the region of interest. If the determination is made that precipitation is present in the region of interest, then the routine proceeds to step 48.

In step 48, in response to a determination that precipitation is present in the region of interest, a wet surface indicator flagged is set and communicated to a controller where various vehicle operations as described earlier can be actuated that include, but are not limited to, braking control, traction control, speed control, driver warning, air baffle control, and vehicle to vehicle communication.

If the determination was made in step 46 that precipitation was not present in the region of interest, then the routine returns to step 40 monitor for the presence of precipitation.

FIGS. 5-8 illustrate the exemplary techniques that may be used in the subroutine set forth in FIG. 4. It should be understood that various techniques are exemplary and the other techniques can be used without deviating from the scope of the invention.

Figure 5:
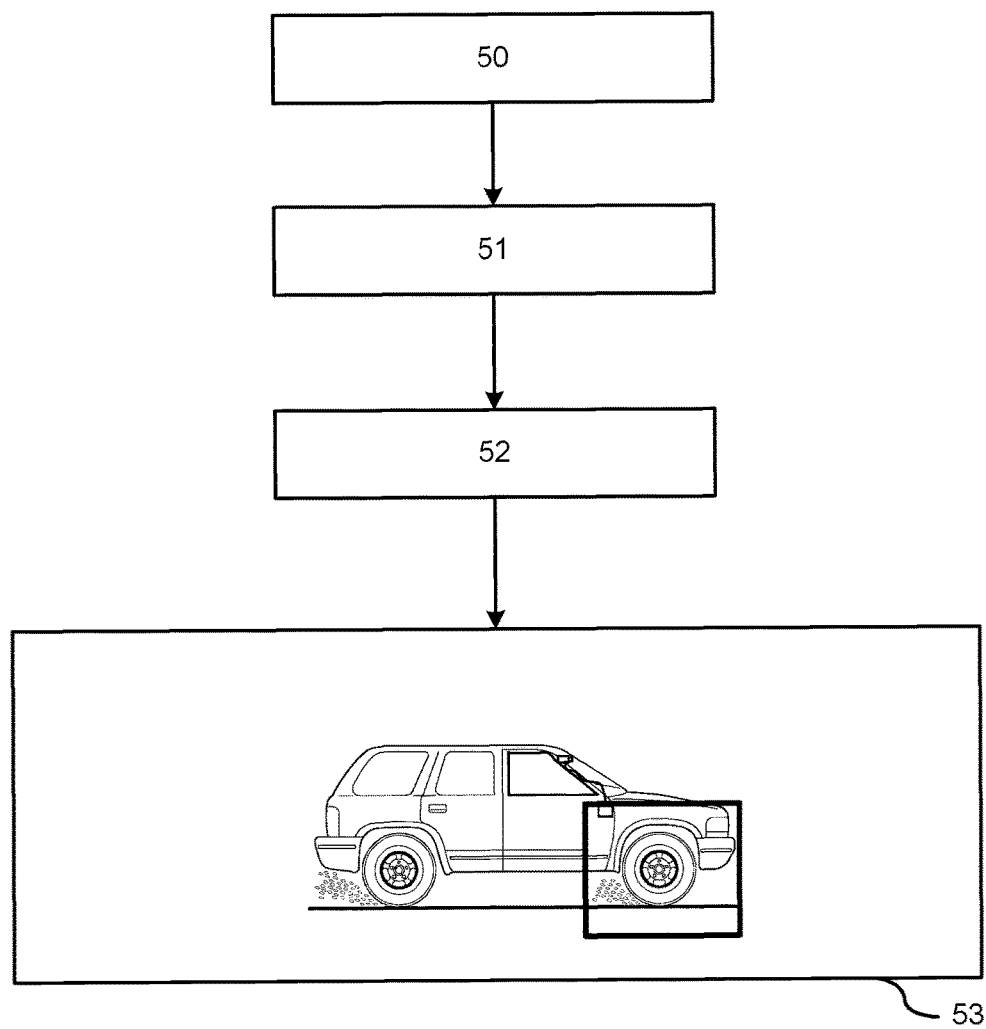
FIG. 5 illustrates a flowchart of an exemplary technique for wheel zone localization.

FIG. 5 illustrates a technique for localizing a wheel of the vehicle. In step 50, radar, lidar, or other sensing systems are actuated at the different regions of the vehicle for monitoring and adjacent lane determining whether a wheel of a vehicle is present. Based on the detection of the wheel from the sensed data, a wheel center position (X, Y) or (X, Y, Z) of a wheel of a vehicle in an adjacent lane relative to the host vehicle is determined. If a wheel vertical position (Z) is not measured by the sensing device, then the range of the vertical position (Z) can be determined using ($Z\_{low} <= Z <= Z\_{upper}$).

In step 51, the wheel center position identified in the real world by the sensing system is mapped onto the captured image. Since the captured image is a localized position of the wheel in the image and the sensed data from the radar device is a real world position, the two sets of data (i.e., image data and radar data) must be calibrated for combining. Various techniques are known to match real-world data with image capture data, and that any of the techniques can be used herein without deviating from the scope of the invention.

In step 52, a full wheel projection is performed. Full wheel projection projects the image of the wheel to a plane that includes a full face of the tire and rim. Since the pose of the real world camera relative to the wheel may not be planar to the wheel (i.e., at an angle), a virtual camera model may be used with the captured image such that a virtual pose is utilized to reorient the image so that a full planar view is obtained of the vehicle wheel. The term virtual camera as used herein is referred to a simulated camera with simulated camera model parameters and simulated imaging surface, in addition to a simulated camera pose. Camera modeling as performed by the processor is described herein as obtaining a virtual image which is a synthesized image of the scene using the virtual camera modeling.

In step 53, in response to generating a full wheel projection, a diameter (d) of the identified wheel is determined. A localization region is identified based on a center of the wheel. The size of the localized region is preferably square and is set a two times the nominal diameter plus tolerances (e.g., $2 \times d\_{nominal}$+tolerance). It should be understood that the size of the square can be any predetermined value times the nominal diameter and is not limited to twice the nominal diameter. It should be understood that the localized region may be determined by other methods or shapes.

Figure 6:
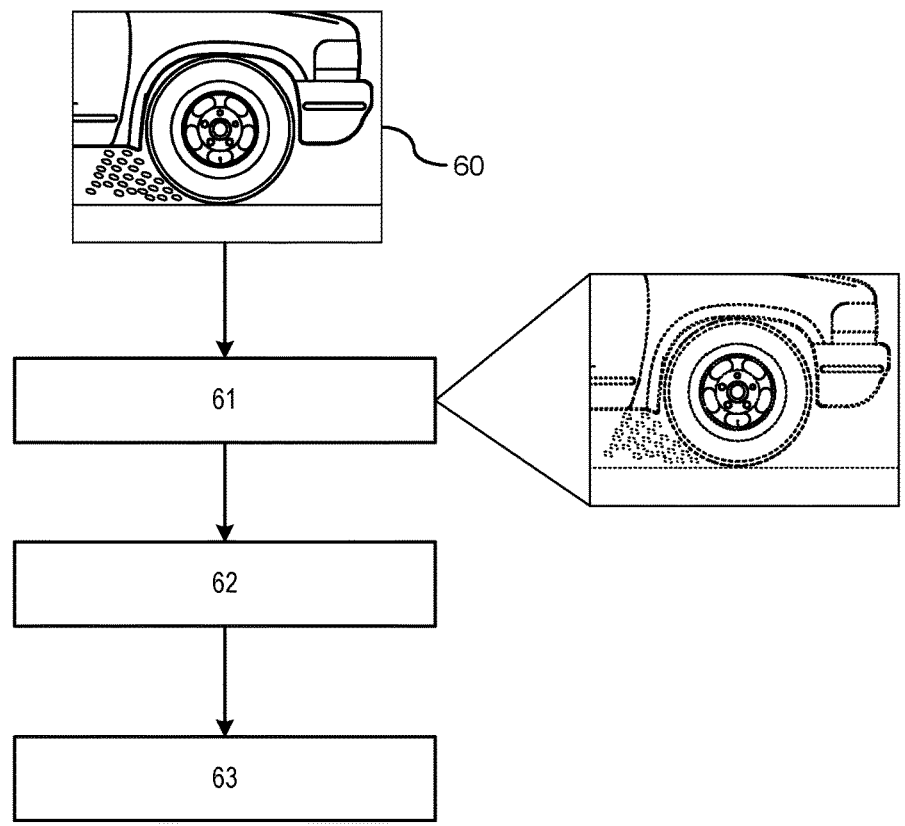
FIG. 6 illustrates a flowchart of an exemplary technique for extracting contours of the localized wheel.

FIG. 6 illustrates a technique for extracting contours in the wheel. In step 60, an image of the wheel on the road is identified, from the full wheel projection and localized region identified from FIG. 5.

In step 61, edge detection including, but not limited to Canny detection, is applied to the image of the wheel for determining edges. Canny detection can be used to detect horizontal, vertical, and diagonal edges in an image. Imperfect image points are obtained that are on a desired curve in the image space. This allows the routine to identify contours of the tire as well as contours of the rim. Other possible edge detection techniques may include, but is not limited to, vertical and horizontal edge detection. Vertical or horizontal edge detection applies a correlation filter to the input image. Any of several filters which magnify changes in the horizontal or vertical direction and attenuate changes in the vertical or horizontal direction may be used.

In step 62, a Hough transform is applied to the edge detection generated image. This image analysis technique is applied to identify positions of shapes which can be parameterized. Hough transform is a feature extraction technique used in image analysis to find imperfect instances of an object within a certain class of shapes. The Hough transform not only identifies lines of the image but also identifies positions of arbitrary shapes (e.g., circles or ellipses). It should be understood that other forms of transforms may be used without deviating from the scope of the invention.

In step 63, various wheel parameters are identified that include, but are not limited to, a center position of the wheel (e.g., in an x, y coordinate plane), tire radius, and rim radius.

Figure 7:
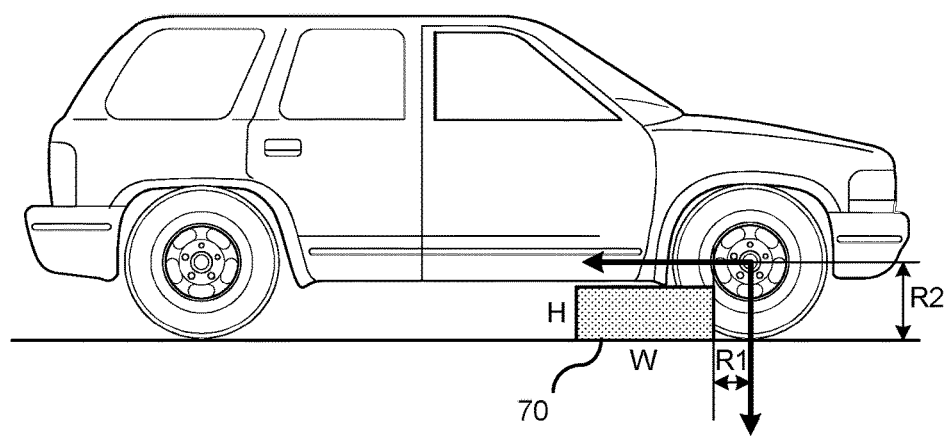
FIG. 7 illustrates a pictorial illustration of an exemplary region of interest.

In FIG. 7, a region of interest 70 relative to the wheel is identified for analyzing whether water displacement is present. Attributes of a vehicle are identified. Such attributes may include, but are not limited to vehicle type, vehicle speed, and specific applications that would assist in identifying a size of the region of interest.

In the example shown herein, a rectangular region of interest 70 is located behind the wheel having a width (W) and a height (H). For example, a starting location of a first side of the rectangle region of interest starts at a distance that is equal to the radius of the rim ($R_1$). A width of the particular region of interest is equal to substantially the radius of the tire (e.g. W=$R_2$ where $R_2$ is equal to the radius of the tire). A height of the rectangular region of interest extends between the ground surface and an underbody of the vehicle and is preferably equal to one half of the radius of the tire (e.g., H=½×$R_2$). A corner of the rectangular region located at a coordinate relative to the center of the wheel. The coordinate is determined by a lateral length from the center of the wheel substantially equal to the radius of a rim (R1) of the wheel and a longitudinal length from the center of the wheel substantially equal to a radius of the tire (R2). It should be understood that other techniques may be used to identify the region of interest without deviating from the scope of the invention. For example, further image analysis may be identified to locate the underbody the vehicle and the ground surface, and therefore, the height may be determined by identifying the region there between the ground surface and the underbody. In addition, other shapes or configurations may be utilized that better defines the region of interest based on a vehicle's specific body type, wheel size, and other vehicle attributes.

Figures 8, 9:
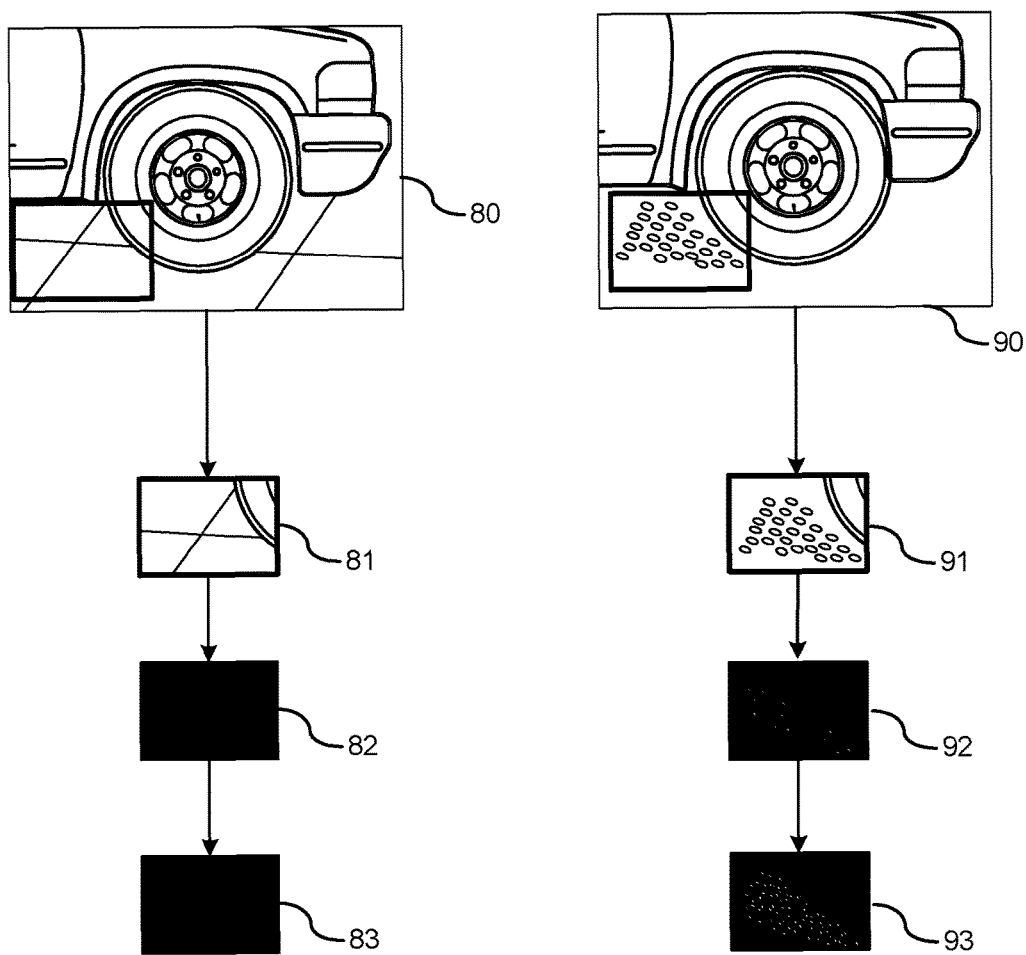
FIG. 8 is an exemplary flow diagram of noise detection on a dry surface.
FIG. 9 is an exemplary flow diagram of noise detection on a wet surface.

FIG. 8 illustrates water disbursement analysis based on analyzing the region of interest identified in FIG. 7 where no precipitation is present. As shown in block 80, an image is captured of the vehicle traveling on the road. The region of interest is identified for analyzing whether precipitation is present. Precipitation that is dispersed by the tire would result in noise in the image that resembles salt and pepper added to an image. A comparison between an unfiltered image and a filtered image is illustrated in showing water is dispersed in the air.

Block 81 represents an expanded view of the extracted region of interest. In block 82, median filtering is applied to the region of interest image. A noise image is generated based on a calculation of a difference between an unfiltered image and a filtered image after applying median filtering. While precipitation may be gray in form, differences between the uniform black color and a gray color representing any water may be subtle. Therefore, in block 83 binary conversion is applied to the image such that any precipitation in the form of gray particles is represented as a white color (representing precipitation) in contrast to a black color (representing no precipitation). It should be understood that other types of filtering may be used aside from median filtering for identifying precipitation in the image without deviating from the scope of the invention.

FIG. 9 illustrates water disbursement analysis based on analyzing the region of interest identified in FIG. 7 where precipitation is present. As shown in block 90, an image is captured of the vehicle traveling on the road. The region of interest is identified (ROI) for analyzing whether water is present.

Block 91 represents an expanded view of the extracted region of interest. As shown with the naked eye in the image of block 91, precipitation can be seen as a mist that is airborne.

In block 92, median filtering is applied to the region of interest image. As shown, the median filtering generates a noise image that is seen as grayscale elements. Due to gray and black being on a substantially close color spectrum, non-uniformity identified by color analysis using a classification module or similar may not be as distinctive for identifying the precipitation in the image. An example of a classification module or machine learning that may be applied for identifying precipitation (e.g., noise) includes, but is not limited to, deep learning. As a result, the routine proceeds to step 93 where the image is precipitation is enhanced for identifying non-uniformity in the image.

In block 93, binary conversion is applied to the image so that any precipitation in the form of gray particles is represented as white elements. As shown in image of block 93, precipitation is clearly identified by the white particles present in the image. As a result, the processor or classification module will analyze the uniformity of the image. Any deviation from uniformity of the image indicates that precipitation is present.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet surface condition of a road with adjacent first and second lanes, the method comprising:
   capturing an image of a road wheel of a remote vehicle traveling in the first lane by an image capture device of a host vehicle traveling in the second lane;
   identifying, in the captured image by a processor of the host vehicle, a region of interest relative to the road wheel of the remote vehicle, wherein the region of interest has a location, a width, and a height, the width and height determined as a function of a tire radius of a tire of the road wheel, and the location determined as a function of the tire radius and a rim radius of a rim of the road wheel, wherein the tire radius and the rim radius are determined by:
   determining a location of the road wheel in the captured image;
   applying an edge detection technique to the road wheel within the captured image;
   applying an image transform analysis to identify respective positions of one or more shapes associated with the road wheel in the captured image;
   identifying contours of the tire and the rim in the captured image;
   identifying a center of the road wheel; and
   determining the tire radius and the rim radius each as a function of a respective distance from the center of the road wheel to the identified contours of the tire or the rim;
   determining whether or not precipitation is present in the region of interest; and
   generating a wet road surface signal in response to a determination that precipitation is present in the region of interest.

2. The method of claim 1, wherein the region of interest is located in a region where precipitation is dispersed by the road wheel of the remote vehicle traveling in the first lane.

3. The method of claim 1, wherein the region of interest is a rectangular region, the width is substantially equal to the tire radius, and the height is substantially equal to one half of the tire radius.

4. The method of claim 1, wherein the region of interest extends in a direction rearward of the center of the road wheel, wherein a corner of the region of interest is located at a coordinate relative to the center of the road wheel, the coordinate being located a lateral length from the center of the road wheel substantially equal to the rim radius of the rim of the road wheel and a longitudinal length from the center of the road wheel substantially equal to the tire radius of the tire.

5. The method of claim 1, wherein the edge detection technique detects horizontal, vertical, and diagonal edges of the road wheel within the captured image.

6. The method of claim 1, wherein the image transform analysis includes a Hough transformation analysis applied to the edge-detected image to identify lines and positions of shapes of the road wheel.

7. A method for determining a wet surface condition of a road with adjacent first and second lanes, the method comprising:
   capturing an image of a road wheel of a remote vehicle traveling in the first lane by an image capture device of a host vehicle traveling in the second lane;
   identifying, in the captured image by a processor of the host vehicle, a region of interest relative to the road wheel of the remote vehicle, the region of interest having a location determined as a function of a location of the road wheel, wherein determining the location of the road wheel in the captured image includes applying a wheel zone localization, wherein application of the wheel zone localization comprises:
   determining a real-world wheel center position of the road wheel based on signals generated by a sensing-based device of the host vehicle;
   mapping the real-world center position of the road wheel to a wheel center position of the road wheel in the captured image;

regenerating the captured image so that an optical axis of the captured image is perpendicular to a plane of a face of the road wheel;

identifying a diameter of a tire of the road wheel in the regenerated image; and generating a localized wheel zone, the localized wheel zone being sized as a function of the diameter of the tire;

determining whether or not precipitation is present in the region of interest; and generating a wet road surface signal in response to a determination that precipitation is present in the region of interest.

8. The method of claim 7, wherein regenerating the captured image so that the optical axis of the captured image is perpendicular to the plane of the face of the road wheel comprises regenerating the captured image until the road wheel in the captured image displays a shape of a circle.

9. The method of claim 8, wherein regenerating the captured image until the road wheel in the captured image displays the shape of a circle includes generating a synthetic image as taken from a virtual camera having an optical axis that is perpendicular to a planar face of the road wheel.

10. The method of claim 9, wherein generating the synthetic image comprises:

identifying a plurality of pixels in the captured image;

determining a respective correlation between each of the pixels in the captured image and a respective one of a plurality of pixels in the virtual image as viewed by the optical axis perpendicular to the planar face of the road wheel; and mapping each of the pixels in the captured image to the correlated respective one of the pixels in the virtual image.

11. The method of claim 7, wherein the sizing the localized wheel zone as a function of the diameter of the tire includes sizing the localized wheel zone as a square, wherein each side of the square is sized to a predetermined value times the diameter of the tire, wherein the square is centered at the wheel center position of the wheel.

12. A method for determining a wet surface condition of a road with first and second lanes, the method comprising:

capturing an image of a road wheel of a remote vehicle traveling in the first lane by an image capture device of a host vehicle traveling in the second lane;

identifying, in the captured image by a processor of the host vehicle, a region of interest relative to the road wheel of the remote vehicle;

determining whether or not precipitation is present in the region of interest in the captured image, including:

analyzing the region of interest as a gray-level image;

applying a filter to the captured image to identify noise in the gray-level image, the noise representing precipitation in the region of interest; and determining whether or not precipitation is present in the region of interest based on a non-uniformity of color in the filtered image; and generating a wet road surface signal in response to a determination that precipitation is present in the region of interest.

13. The method of claim 12, wherein the filter includes a median filter that generates a filtered image of the captured image that includes no noise, and wherein a noise image is generated as function of a difference between an unfiltered image of the captured image and the filtered image.

14. The method of claim 12, further comprising applying a binary conversion to the filtered image to determine whether or not precipitation is present, the binary conversion converting precipitation to a white color.

15. The method of claim 1, wherein the wet road surface signal includes an alert to a driver of the host vehicle of a potential hydroplaning.

16. The method of claim 1, wherein the wet road surface signal includes an alert to a driver of the host vehicle of a potential reduced traction between one or more vehicle tires of the host vehicle and the road surface.

17. The method of claim 1, wherein the host vehicle includes a vehicle braking system and a vehicle controller, the method further comprising transmitting the wet road surface signal to the vehicle controller, the vehicle controller autonomously actuating the vehicle braking system in response to the wet road surface signal.

18. The method of claim 1, wherein the wet road surface signal includes an alert to a driver of the host vehicle to reduce a vehicle speed.

19. The method of claim 1, wherein the host vehicle includes a traction control system and a vehicle controller, the method further comprising transmitting the wet road surface signal to the vehicle controller, the vehicle controller autonomously actuating the traction control system in response to the wet road surface signal.

20. The method of claim 1, further comprising transmitting the wet road surface signal to a wireless communication system with an indicator to alert other vehicles of the wet surface condition.

21. The method of claim 1, wherein the wet road surface signal includes an alert to a driver of the host vehicle against a use of cruise control.

22. The method of claim 1, wherein the host vehicle includes a cruise control system and a vehicle controller, the method further comprising transmitting the wet road surface signal to the vehicle controller, the vehicle controller autonomously disabling the cruise control system in response to the wet road surface signal.

23. The method of claim 1, further comprising transmitting the wet road surface signal to a vehicle controller of the host vehicle, the vehicle controller autonomously shutting baffles on an air intake scoop of the host vehicle in response to the wet road surface signal.

24. The method of claim 1 wherein the wet road surface signal includes an alert to a driver of the host vehicle against a use of automated vehicle features.

* * * * *

UNITED STATES PATENT AND TRADEMARK OFFICE
CERTIFICATE OF CORRECTION

PATENT NO. : 9,972,206 B2
APPLICATION NO. : 14/957943
DATED : May 15, 2018
INVENTOR(S) : Qingrong Zhao et al.

Page 1 of 1

It is certified that error appears in the above-identified patent and that said Letters Patent is hereby corrected as shown below:

In the Claims

Column 9, Line 42, in Claim 12, "a wet surface condition of a road with first and second lanes" should read -- a wet surface condition of a road with adjacent first and second lanes --.

Signed and Sealed this
Sixth Day of November, 2018

Andrei Iancu
*Director of the United States Patent and Trademark Office*